US008559800B2

(12) United States Patent
Ellis et al.

(10) Patent No.: US 8,559,800 B2
(45) Date of Patent: Oct. 15, 2013

(54) HEATED FLUID CONDUIT END COVERS, SYSTEMS AND METHODS

(75) Inventors: Michael H. Ellis, Denver, CO (US); Timothy Deans, Parker, CO (US); Evan Twarog, Wolcott, CT (US); Donald R. Gilbreath, Castle Rock, CO (US); Walker Bolger, Denver, CO (US); Tim Saupe, Parker, CO (US)

(73) Assignee: The Gates Corporation, Denver, CO (US)

( * ) Notice: Subject to any disclaimer, the term of this patent is extended or adjusted under 35 U.S.C. 154(b) by 749 days.

(21) Appl. No.: 12/704,269

(22) Filed: Feb. 11, 2010

(65) Prior Publication Data

US 2010/0206415 A1   Aug. 19, 2010

Related U.S. Application Data

(63) Continuation-in-part of application No. 12/378,435, filed on Feb. 13, 2009.

(51) Int. Cl.
   *E03B 7/10* (2006.01)
(52) U.S. Cl.
   USPC .............................. 392/468; 392/479; 392/469
(58) Field of Classification Search
   None
   See application file for complete search history.

(56) References Cited

U.S. PATENT DOCUMENTS

| | | | | |
|---|---|---|---|---|
| 2,516,864 A | * | 8/1950 | Gilmore et al. | 156/143 |
| 2,683,673 A | * | 7/1954 | Silversher | 428/328 |
| 2,883,513 A | * | 4/1959 | Schnabel | 219/528 |
| 3,163,707 A | * | 12/1964 | Darling | 174/47 |
| 3,355,572 A | * | 11/1967 | Chrow | 392/468 |
| 3,727,029 A | * | 4/1973 | Chrow | 392/468 |
| 3,746,832 A | * | 7/1973 | Bernard et al. | 219/137.9 |
| 4,038,519 A | * | 7/1977 | Foucras | 392/472 |
| 4,156,127 A | * | 5/1979 | Sako et al. | 392/480 |
| 4,180,723 A | * | 12/1979 | Szupillo | 219/541 |
| 4,323,174 A | * | 4/1982 | Wood | 222/146.2 |
| 4,455,474 A | * | 6/1984 | Jameson et al. | 392/472 |
| 4,484,061 A | * | 11/1984 | Zelinka et al. | 392/480 |

(Continued)

FOREIGN PATENT DOCUMENTS

WO    WO 00/19773    6/2000    ............ H05B 3/34

OTHER PUBLICATIONS

Notification of Transmittal of the International Search Report and the Written Opinion of the International Searching Authority, PCT/US/2010/000405 Dated Jun. 4, 2010.

*Primary Examiner* — Thor Campbell
(74) *Attorney, Agent, or Firm* — J. A. Thurnau, Esq.; P. N. Dunlap, Esq.

(57) ABSTRACT

A fluid conduit body having a semi-conductive material disposed therein and at least one wire coupling an electrical power supply to the conduit to provide an electrical current therethrough to heat the fluid conduit also has an end cover molded over a fitting fitted to an end of the conduit and over an end of the wire coupling the power supply to an end of the conduit. Alternatively, a fluid conduit heating system employs a semi-conductive sleeve disposed over a fluid conduit with the sleeve extending at least partially over a fitting fitted to an end of the conduit. An electrical power supply is coupled to each end of the sleeve to provide an electrical current through the semi-conductive sleeve to heat the sleeve and the fluid conduit. An end cover is molded over at least a portion of the fitting and the sleeve extending thereover.

18 Claims, 6 Drawing Sheets

(56) References Cited

U.S. PATENT DOCUMENTS

| | | | |
|---|---|---|---|
| 4,553,023 A * | 11/1985 | Jameson et al. | 392/472 |
| 4,581,521 A | 4/1986 | Grise | 219/535 |
| 4,874,925 A * | 10/1989 | Dickenson | 392/472 |
| 5,073,625 A * | 12/1991 | Derbyshire | 530/333 |
| 5,081,326 A * | 1/1992 | Usui | 174/47 |
| 5,241,147 A * | 8/1993 | Ahlen | 219/629 |
| 5,381,511 A * | 1/1995 | Bahar et al. | 392/472 |
| 5,394,507 A * | 2/1995 | Okamoto | 392/480 |
| 5,713,864 A * | 2/1998 | Verkaart | 604/113 |
| 5,714,738 A * | 2/1998 | Hauschulz et al. | 219/535 |
| 5,832,178 A * | 11/1998 | Schave | 392/472 |
| 5,933,574 A * | 8/1999 | Avansino | 392/468 |
| 6,738,566 B2 * | 5/2004 | Pagnella | 392/472 |
| 7,123,826 B2 * | 10/2006 | Belcher | 392/478 |
| 7,266,293 B1 * | 9/2007 | Dundas | 392/478 |
| 7,732,735 B2 * | 6/2010 | Bourget et al. | 219/221 |
| 7,991,273 B2 * | 8/2011 | Sonderegger et al. | 392/478 |
| 2007/0045275 A1 | 3/2007 | Steinhauser et al. | 219/228 |

\* cited by examiner

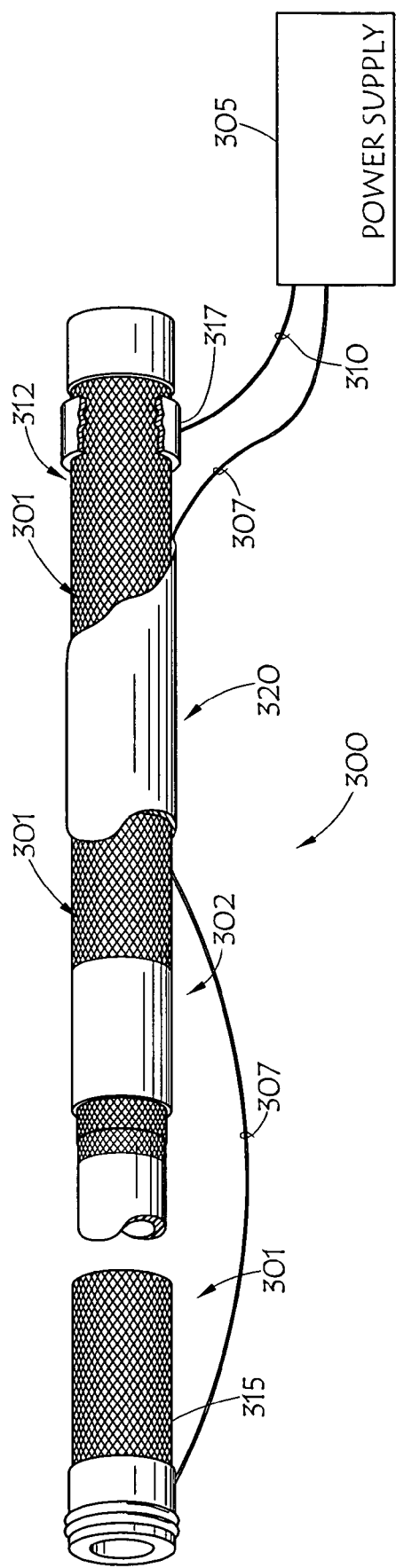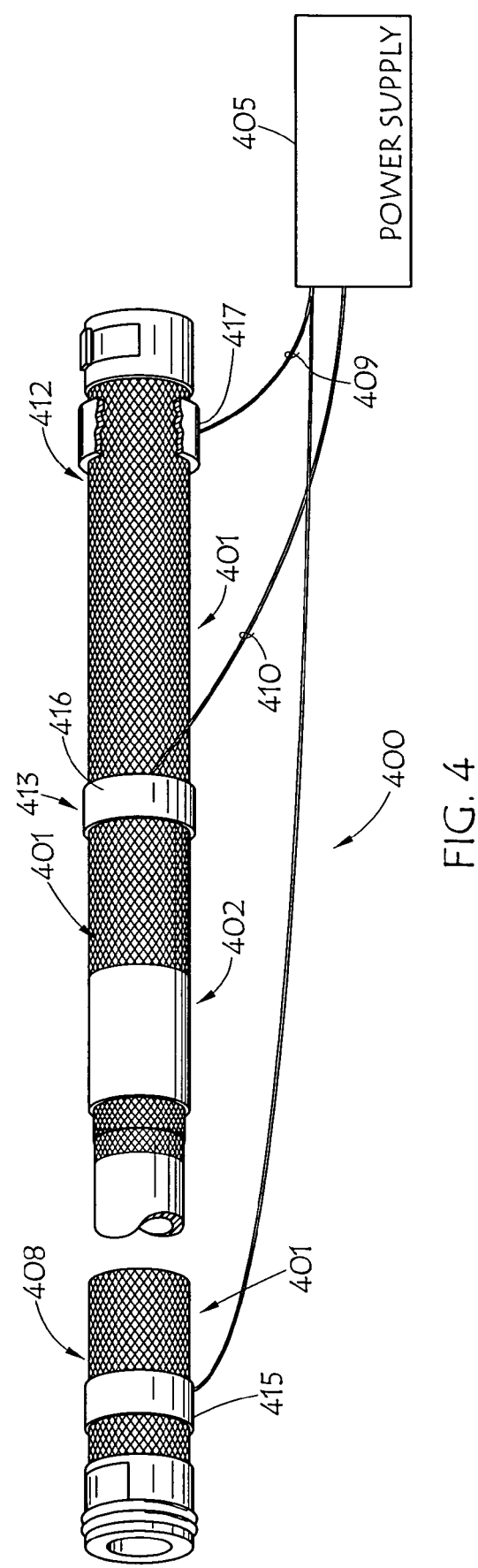

HEATED FLUID CONDUIT END COVERS, SYSTEMS AND METHODS

CROSS-REFERENCE TO RELATED APPLICATION

This is a continuation in part of U.S. patent application Ser. No. 12/378,435, entitled Heated Fluid Conduits, Systems and Methods, Filed Feb. 13, 2009, which is incorporated herein by reference.

BACKGROUND OF THE INVENTION

1. Field of the Invention

This invention relates generally to fluid conduits such as hoses and tubes, more particularly to heated fluid conduits such as fluid conduits heated using semiconductive resistance heating, and specifically to molded, preferably waterproof connector ends for such hoses.

2. Description of the Prior Art

Selective Catalytic Reduction (SCR) vehicles, referred to in Europe as Euro V vehicles, are diesel powered motor vehicles which are compatible with the use of an operating fluid to reduce emissions. Typically, the SCR vehicle has a urea tank, separate from the fuel tank, which is used to carry an operating fluid such as an automotive urea solution, or the like. Automotive Urea Solution (AUS) is a solution of high purity urea in de-mineralized water. AUS is stored in a urea tank of an SCR vehicle and is sprayed into the exhaust gases of the vehicle in order to convert oxides of nitrogen into elementary nitrogen and water. An SCR vehicle may then advantageously satisfy various emission standards, such as the Euro V Emissions Standard.

Problematically, AUS freezes at a temperature of approximately minus eleven degrees centigrade. In order to ensure this method of reducing emissions in an SCR vehicle remains effective, the AUS needs to be maintained in a liquid state to allow injection SCR vehicles generally rely on a heating wire or the like, which may be molded into or wrapped around the AUS hose or line to avoid freezing of the AUS. This is a rather inefficient and inflexible solution that requires a complete redesign of the fluid line to change its heating properties. Thus, to change the heating characteristics of an internal wire assembly, another production run of the hose must be produced and the resistance per foot is changed when the hose is being extruded by either changing the wire pitch, the wire size or adding more wires into the system, or a combination of all three.

Also, oil drilling rigs are being operated in harsher environments as oil is drilled for in Alaska and the Arctic and Antarctica. It is now not unusual for a rig to start up in minus sixty degree Fahrenheit weather. This cold weather has an adverse effect on equipment and hydraulic components on a drill rig. When starting up a hydraulic machine at these cold temperatures it is not unusual for the seals to rupture in valves and cylinders.

SUMMARY

The present invention is directed to fluid conduits, systems and methods which heat the fluid in the conduit (a hose, tube or the like). The present invention is an electrically heated hose or other conduit that warms the fluid, before starting of the associated equipment to prevent seal and component failure in hydraulic systems and/or that heats a urea line to prevent freezing of AUS. Embodiments of this hose may use a semi-conductive member of rubber or carbon fiber filament to create a resistive heating element within the hose, or a semi-conductive sleeve disposed about the hose. The hose can be used for many different applications for heating fluids that the hose is conveying. The materials that could be heated are hydraulic fluid, urea mixtures for catalytic converters, grease lines, oil lubrication lines and/or the like.

The semiconductive resistive heated hose is composed of an electrically conductive rubber tube on the inside of the hose with a resistance of approximately 2 to 15 ohms per foot. It can also be composed of a composite, braided, carbon fiber tensile member or a carbon fiber sleeve that is pushed over the hose assembly after the hose is constructed. This tube or sleeve, because of the electrical resistance, will heat up when a voltage is applied to it in such a manner as to provide an electrical path. The heat that is produced in the tube or sleeve will warm the internal fluid lowering the viscosity of the fluid and allowing it to flow without damaging components. This tube or sleeve can be constructed into or on a conventional high pressure, wire reinforced, hydraulic hose, or the carbon fiber can also be the tensile member of the hose. When electricity is connected to the tube or sleeve electricity will flow through the tube of sleeve to ground and the result will be a heated hose that is in contact with the fluid.

To facilitate operation of a semi-conductive heating sleeve it may be advantageous to warm the couplings associated with the hose or tube. If the couplings are not warmed with the hose, it may be difficult for fluid may to pass through the couplings. Therefore, it may be advantageous to heat the couplings along with the hose, such as by extending the heating sleeve over the hose couplings. Also, preferably, the hose couplings are insulated and protected along with the wiring providing power to the heating sleeve.

In accordance with embodiments of the present invention a method for providing a heated fluid conduit, such as a hose or tube, might include disposing a semi-conductive material in the body of a fluid conduit and applying an electrical current across the body of the fluid conduit, heating the fluid conduit. In these embodiments the semi-conductive material might comprise a semi-conductive carbon fiber material, which might be made up of carbon fiber threads or carbon fiber tensile reinforcement material. If the conduit is a hose the semi-conductive material might be disposed in the tube of the hose or in the cover.

Thus, in accordance with embodiments of the present invention a heated fluid conduit, such as a hose or tube, might have a body with a semi-conductive material disposed therein and might include means for coupling an electrical power supply to each end of the conduit to provide a voltage across the conduit and a current therethrough, heating the fluid conduit. This semi-conductive material might be a semi-conductive carbon fiber material, which might be made up of carbon fiber threads and/or carbon fiber tensile reinforcement material. In the case of a hose, the semi-conductive material may be disposed in the tube of the hose or in the cover of the hose.

Alternatively, in accordance with other embodiments of the present invention a method for heating a fluid conduit might comprise disposing a semi-conductive sleeve over the fluid conduit and applying an electrical current to the semi-conductive sleeve, heating the sleeve and the fluid conduit within. In accordance with various of these embodiments the sleeve might comprise a fabric sleeve having carbon fiber threads which are at least semi-conductive.

Therefore, in other embodiments of the present invention a fluid conduit heating system might employ a semi-conductive flexible sleeve disposed over a fluid conduit and an electrical power supply coupled to each end of the sleeve to provide a voltage across the sleeve and a resulting current through the semi-conductive sleeve, heating the sleeve and the fluid conduit. In particular, a first conductor can be conductively coupled to a first end of the sleeve and a second conductor conductively coupled to a second end of the sleeve, with the electrical power supply connected to the conductors to provide the voltage across the conductors and the resulting current through the semi-conductive sleeve. In this embodiment, one of the conductors, such as a wire, may be disposed along the sleeve, such as within the sleeve, such that the free ends of the conductors are at a same end of the sleeve, facilitating connecting the conductors to the power supply, such as through the electrical system of a vehicle or piece of equipment. In accordance with various embodiments the sleeve is a fabric sleeve having carbon fiber threads which are semi-conductive.

In some embodiments such a fluid conduit heating system might include a conductive ferrule disposed at each end of the sleeve in conductive contact with the sleeve, with a first conductor conductively coupled to a first of the ferrules and a second conductor connected to a second of the ferrules, such that the electrical power supply may be connected to the conductors to provide a voltage across the conductors and a resulting current through the semi-conductive sleeve.

As noted above, in various embodiments the electrical power supply may be coupled to each end of the conduit or sleeve. However, in other embodiments one terminal of the electrical power supply may be coupled to each end of the conduit or sleeve, and another terminal of the electrical power supply may be coupled to the conduit or sleeve at one or more points therebetween.

Advantageously, the present sleeve heating system affords an ability to tailor the resistance per foot at assembly to meet heating requirements needed for individual conduit lengths. By using a sleeve with different resistance levels, such as may be expressed in ohms per foot one may lower the resistance per foot for a longer length assembly.

In some embodiments of the present invention, a cover may be disposed over a coupling fitted to an end of the conduit and/or over an end of a wire coupling the power supply to an end of the conduit, with the wire passing through an opening in the cover. In some sleeve embodiments of the present conduits, systems or methods, the sleeve may extend over the coupling and a cover may be disposed over the coupling and the sleeve extending over the coupling, as well as over an end of a conductor coupling the power supply to an end of the sleeve, again with the conductor passing through the opening in the cover. Preferably, the cover insulates the coupling retaining heat generated. Also to retain heat, various embodiments may employ an insulating jacket disposed over the conduit (and sleeve).

Since heated SCR or hydraulic hoses may often be exposed to the elements (i.e. rain and snow), directly or indirectly, during use, the potential exists for moisture to penetrate the hose end and interrupt the electrical connection. Most manufacturers of SCR hose use a snap over cover that does not eliminate the entrance of moisture to the end fittings, leading to interruption of the electrical connection. This in turn will interrupt the heating of the hose until it dries out. The interruption of the heating of the hose and fluid within the hose is not desirable. Thus, it may be advantageous in accordance with the present invention to provide a water proof, or at least "weather proof" cover over the ends of the hose that seals moisture from contacting the electrical circuit.

Therefore in accordance with the present invention the ends of the present heated hose are covered from moisture, thereby preventing moisture from interrupting heating of the hose. Preferably, such a cover comprises an injection molded plastic that will cover the end of the connector and seal against insulation material covering the heating sleeve and the hose. The molded plastic will also preferably have provisions for sealing around power wires to eliminate moisture from migrating into the electrical connection. Ideally, this sealing of the heated hose will also allow for a complete water submersible heated hose assembly to be produced.

Thus, in accordance with such embodiments of the present invention a heated fluid conduit might comprise not only a fluid conduit having a body with a semi-conductive material disposed therein and at least one wire coupling an electrical power supply to the conduit to provide a voltage across the conduit and an electrical current therethrough to heat the fluid conduit, but also an end cover molded over a fitting fitted to an end of the conduit and over an end of the wire coupling the power supply to an end of the conduit. As discussed above, the electrical power supply may be coupled to each end of the conduit, and also possibly another terminal of the electrical power supply may be couple to the conduit at one or more points therebetween. Preferably, the end cover insulates the fitting retaining heat provided by the current and an insulating jacket disposed over the conduit may retain the fluid conduit's heat.

Thereby, a method for providing a heated fluid conduit having molded end covers might comprise disposing a semi-conductive material in the body of a fluid conduit, molding an end cover at an end of the conduit, capturing an electrical conductor in contact with the body of the conduit, and applying an electrical current, through the electrical conductor, across the body of the fluid conduit, heating the fluid conduit. As noted above, the semi-conductive material might comprise semi-conductive carbon fiber material and the semi-conductive material might be disposed in an interior tube of a hose and/or in a covering layer of a hose.

Alternatively, a fluid conduit heating system in accordance with these molded end embodiments might employ a semi-conductive sleeve disposed over a fluid conduit with the sleeve extending at least partially over a fitting fitted to an end of the conduit. An electrical power supply may be coupled to each end of the sleeve to provide a voltage across the sleeve and a resulting electrical current through the semi-conductive sleeve to heat the sleeve and the fluid conduit, and an end cover is molded over at least a portion of the fitting and the sleeve extending thereover. Again, one terminal of the electrical power supply is preferably coupled to each end of the sleeve and another terminal of the electrical power supply may be coupled to the sleeve at one or more points therebetween. As with the above embodiments, the end cover preferably insulates the fitting, retaining heat provided by the current, and an insulating jacket may be disposed over the conduit and the sleeve, retaining the heating of the sleeve and the fluid conduit.

Hence, a method for providing a heated fluid conduit having molded end covers might comprise disposing a semi-conductive sleeve over a fluid conduit, molding an end cover at an end of the fluid conduit, capturing an end of the sleeve and an electrical conductor in contact with the sleeve, and applying an electrical current, through the electrical conductor to the semi-conductive sleeve, heating the sleeve and the fluid conduit within. As noted, the sleeve might comprise a fabric sleeve having carbon fiber threads which at least are semi-conductive. Also, similar to as discussed above the electrical current may be applied by coupling a first terminal of an electrical power supply to a first end of the sleeve, coupling a second terminal of the power supply to a second end of the sleeve, and providing a voltage from the power supply across the terminals. Alternatively, the electrical current may be applied by coupling a first terminal of an electrical power supply to each end of the sleeve, coupling a second terminal of the power supply to the sleeve in between the ends, and selectively providing a voltage from the power supply across the terminals. Again, the conduit and sleeve may be insulated to retain heat.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 3 is a partially fragmented illustration of another embodiment of a fluid conduit heating system in accordance with the present invention;

FIG. 4 is a partially fragmented illustration of yet another embodiment of a fluid conduit heating system in accordance with the present invention employing parallel heating circuits;

DETAILED DESCRIPTION

Figure 1:
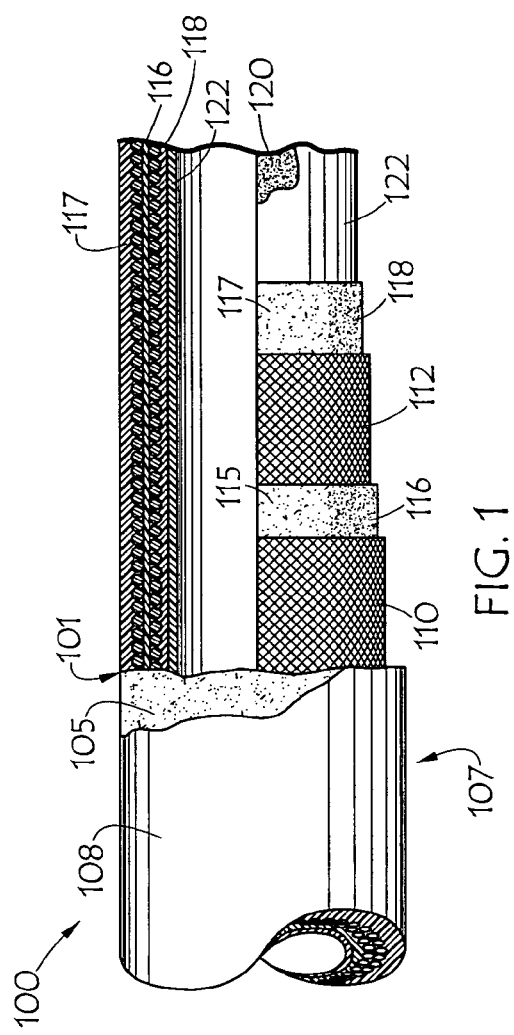
FIG. 1 is a partially fragmented illustration of an embodiment of a heated fluid conduit of the present invention.

In FIG. 1, a fragmented view of an embodiment of heated fluid conduit 100 is shown. Illustrated fluid conduit 100, a hose, is shown having body 101 with semi-conductive material disposed therein. The semi-conductive may take the form of "chopped" material 105, disposed in cover 108; woven or braided semi-conductive textile material 110 and/or 112; "chopped" material 115 and/or 117, disposed in intermediate hose layers 116 and 118; and/or "chopped" material 120, disposed in tube 122. In the illustrated example of FIG. 1, this conductive material is intended to be illustrated as carbon fiber reinforcement material. Preferably, these carbon fiber threads act as tensile reinforcement material in illustrated hose 100. Electrical power, such as may be provided through the electrical system of a vehicle or piece of equipment may be supplied to each end of conduit 100 such as through conductive wires, or the like, electrically coupled to the hose to provide a voltage across conduit 100 and a current therethrough, heating fluid conduit 100 due to resistive conductivity provided by the semi-conductive reinforcement material.

In accordance with the present invention the fluid conduit may be a hose, as illustrated. Alternatively, the fluid conduit may be a tube, such as a plastic tube, with the semi-conductive material disposed in the body of the tube.

Figure 2:
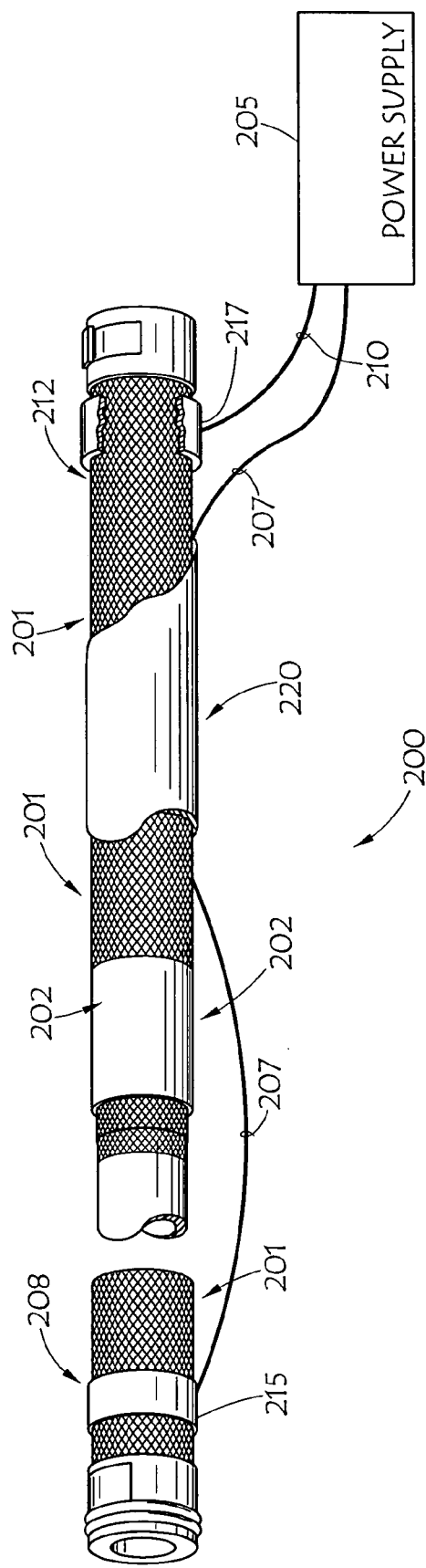
FIG. 2 is a partially fragmented illustration of an embodiment of a fluid conduit heating system in accordance with the present invention.

In accordance with other embodiments of the present invention a fluid conduit heating system (200), such as illustrated in FIG. 2, might employ semi-conductive sleeve 201 disposed over fluid conduit 202 and electrical power supply 205, such as might be provided by a vehicle's electrical system of the electrical system associated with equipment using the fluid conduit. This supply of electricity is preferably coupled to each end of sleeve 201. For example, a first conductor, such as illustrated wire 207, may be conductively coupled to first end 208 of sleeve 201 and a second conductor, such as illustrated wire 210, may be conductively coupled to second end 212 of sleeve 201. To facilitate such coupling electrical connectors 215 and 217 may be disposed at respective ends 208 and 212 of sleeve 201. The electrical power supply provides a voltage across conductors and 207 and 210 and the resulting current through semi-conductive sleeve 201 causes the sleeve, and thereby the conduit within, to heat, due to the electrically semi-conductive nature of the material making up the sleeve. Preferably, conductive wires 207 and 210 are disposed along the sleeve such that ends of the conductors connected to the power supply are at a same end of hose assembly 200 (end 212 of sleeve 201 in FIG. 2). One, or both, of wires 207 and 210 may be at least partially disposed either within sleeve 201, or in a further outer covering of the hose, such as illustrated insulation sleeve 220. Insulation sleeve 220 may be made of any material which sufficiently retains the heat generated by hose sleeve 201, such as closed cell rubber foam.

Preferably, sleeve 201 is flexible. The sleeve might comprise a fabric having carbon fiber threads which are semi-conductive, similar to the hose of FIG. 1. The fluid conduit is illustrated as hose 202. However, the fluid conduit could be a tube, such as a plastic or metal tube.

An alternative embodiment of fluid conduit heating system 300 is illustrated in FIG. 3. In accordance with the present invention system 300 might include semi-conductive sleeve 301, similar to sleeve 201 above, disposed over fluid conduit 302. Conductive ferrule 315 or 317 disposed at each end, 308 and 312 respectively, of sleeve 301 in electrically conductive contact with sleeve 301. First conductor is conductively coupled to first ferrule 315 and second conductor 310 is connected to a second ferrule 317. Electrical power supply 305, connected to conductors 307 and 310, preferably provides a voltage across the conductors and a resulting current through semi-conductive sleeve 301. As with embodiment 200 above, sleeve 301 is also preferably flexible and may comprise a fabric sleeve material having carbon fiber threads which are semi-conductive. Also, similar to embodiment 200 the fluid conduit in system 300 may be a hose (as shown in FIG. 3), a metal tube, a plastic tube, or the like. Alternatively, an embodiment similar to that shown in FIG. 3 may employ non-conductive ferrules which may hold the end of a conductor in electrically conductive contact with the semi conductive sleeve or hose body, in provide a current through the sleeve or semiconductive body to heat the conduit in accordance with the present invention.

FIG. 4 is a partially fragmented illustration of an embodiment of fluid conduit heating system 400 employing parallel heating circuits. Parallel heating may be provided to any embodiment of the present invention by coupling one terminal of the electrical power supply to each end of the conduit or sleeve, and another terminal of the electrical power supply to the conduit or sleeve at one or more points therebetween. For purposes of illustration, FIG. 4 applies such a parallel heating circuit embodiment to a sleeve embodiment similar to embodiment 200, illustrated in FIG. 2. However, more than the two illustrated parallel circuits could be provided in accordance with the present systems and methods. In FIG. 4, semi-conductive sleeve 401 is disposed over fluid conduit 402 and electrical power supply 405, such as might be provided by a vehicle's electrical system of the electrical system associated with equipment using the fluid conduit is coupled to sleeve 401. One terminal of power supply 405 is preferably coupled to each end of sleeve 401. For example, a first conductor, such as illustrated wire 407, may be conductively coupled to first end 408 of sleeve 401 and a second conductor, such as illustrated wire 409, may be conductively coupled to second end 412 of sleeve 401, each of conductors 407 and 409 are preferably coupled to a same terminal of power supply 405. A third conductor, such as illustrated wire 410, may be conductively coupled to sleeve 401 at some other point(s), such as mid-point 413, between ends 408 and 412. To facilitate such coupling electrical connectors 415, 418, and 417 may be disposed at end 408, midpoint 413 and end 412, respectively. The electrical power supply provides a voltage across conductors 407 and 410, and also across conductors 409 and 410, in a parallel manner, the resulting currents through semi-conductive sleeve 401 causes the sleeve, and thereby the conduit within, to heat, due to the semi-conductive nature of the material making up the sleeve. In a parallel circuit embodiment, the conduit is heated at a greatly accelerated rate. For example, a single circuit sleeve embodiment such as shown in FIGS. 2 and 3 might heat fluid in a conduit from −20° F. to 8° F. in 30 minutes, while a parallel circuit embodiment such as illustrated in FIG. 4 might heat the fluid in the conduit from minus 20° F. to 8° F. in less than six minutes.

Additionally, as mentioned above, more than two parallel circuits may be provided in accordance with the present systems and methods. In such embodiments the paired terminals of the power supply may be electrically conductively coupled to the hose or sleeve in any number of pairs along the length of the hose or sleeve to provide the aforementioned multiple parallel circuits. Some of these embodiments might use switching, or the like, to control operation of such circuits, or even the effective number of circuits. For example, in the embodiment illustrated in FIG. 4 an open switch in conductor 407 or 409 could disable the associated circuit. Additionally, or alternatively, a switch might open conductor 410 and shunt the output therefrom to conductor 407 or 409 to provide conduit 400 a single restive heating circuit along its length.

Figure 5:
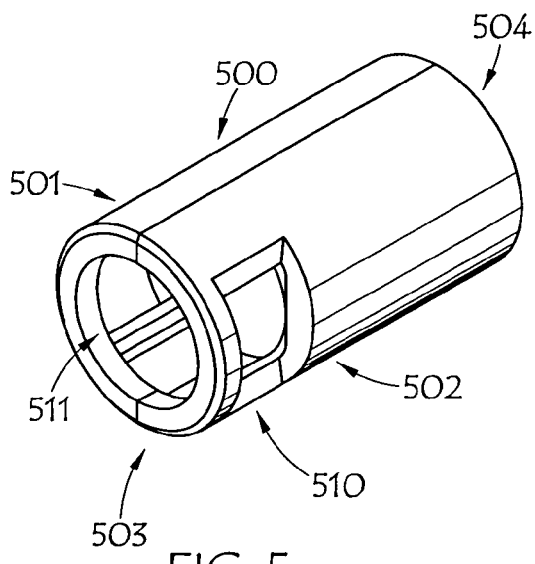
FIG. 5 is a perspective illustration of an embodiment of a cover for use with various embodiments of the present fluid conduit heating system.
Figure 6:
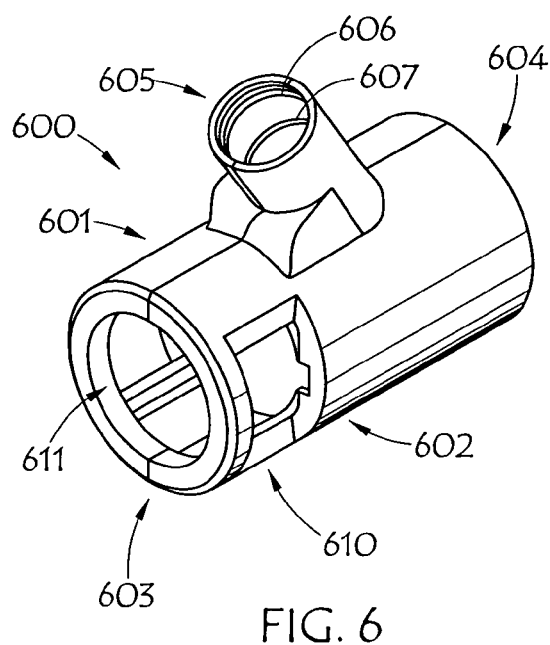
FIG. 6 is a perspective illustration of another embodiment of a cover for use with various embodiments of the present fluid conduit heating system.
Figure 7:
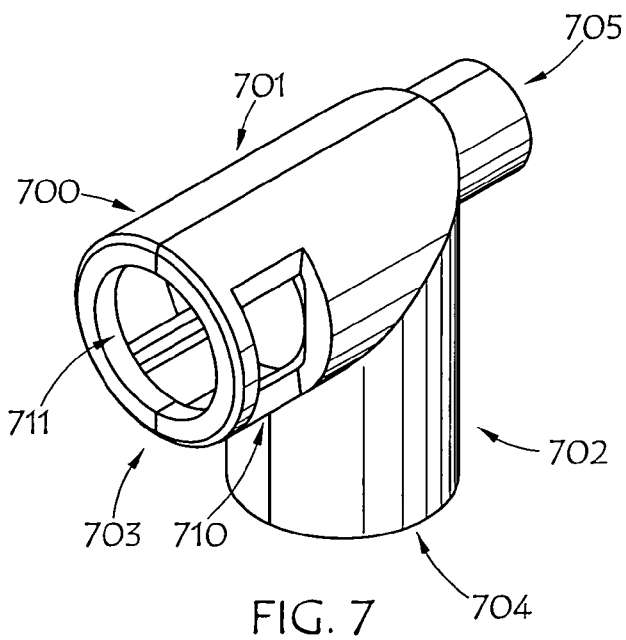
FIG. 7 is a perspective illustration of yet another embodiment of a cover for use with various embodiments of the present fluid conduit heating system.
Figure 8:
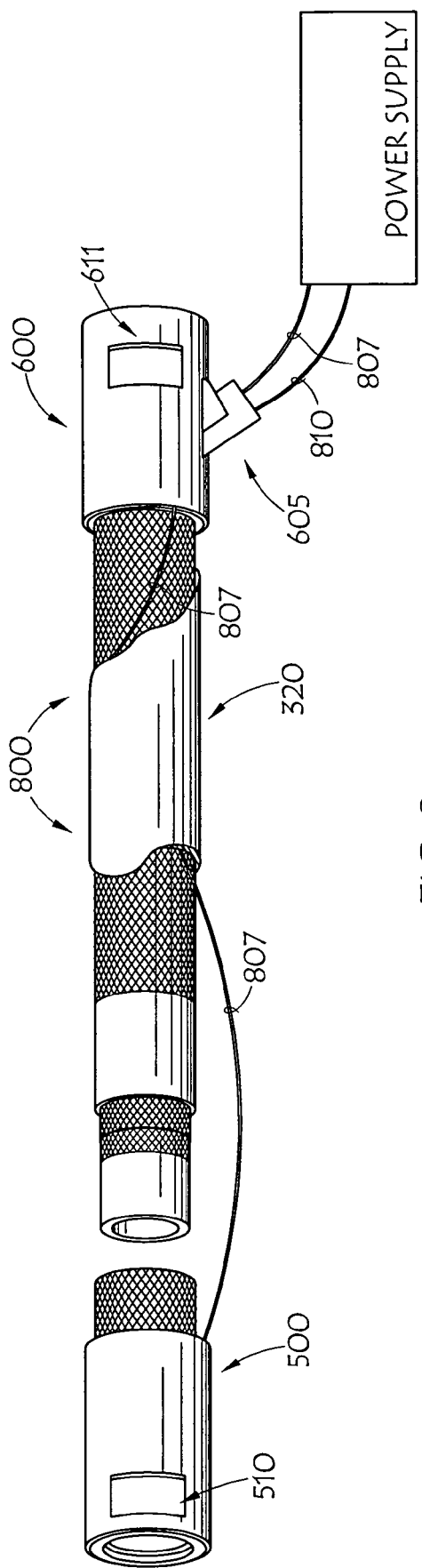
FIG. 8 is a partially fragmented side illustration of an embodiment of a fluid conduit heating system in accordance with the present invention employing coupling covers.

FIGS. 5, 6 and 7 are perspective illustrations of embodiments of covers 500, 600 and 700 for use with various embodiments of the present heated fluid conduits and/or fluid conduit heating systems. FIG. 8 is a partially fragmented illustration of embodiment 800 of a fluid conduit heating system in accordance with the present invention employing coupling covers similar to cover 500 and 600 illustrated in FIGS. 5 and 6.

Covers 500, 600 and 700 provide protection and insulation for quick-connect couplings and wiring, such as conductors 807 and 810, associated with a heated fluid conduit in accordance with various embodiments of the present invention. The embodiments of covers 500, 600 and 700 shown are comprised of paired molded plastic parts, placed together to form a hard protective coverings for the couplings and the wiring. The illustrated covering embodiments each comprise two pieces, which are generally mirror images of each other, 501 and 502, 601 and 602, and 701 and 702. The two halves may be adapted to "snap" together, thus alleviating any need for an adhesive or other cumbersome method of joining the two halves together. Alternatively, or additionally, the two pieces may be molded together in one mold with a small bit of plastic holding them together. This would allow the two pieces to be "hinged" over for installation.

Covers 500 and 600 are intended for use on straight couplings, while embodiment 700 is intended for use on a ninety-degree elbow coupling. However, within the scope of the present invention, it is contemplated that any number of fitting configurations may be employed and covered in a similar fashion in a heated conduit system. On the internal surfaces of various embodiments of such covers, ridges may be employed to grip corrugated tubing, other types of sleeves, a hose cover, or the like. These ridges may hold such a cover in place and help prevent exposure of a heating sleeve.

Along with the two openings in the cover for the hose and coupling end (i.e. openings 503, 504, 603, 604, 703 and 704), there may be a separate third opening (605 or 705) for wiring, such as for conductors 801, or the like. As shown in FIG. 5, such a third opening may not be employed on every cover since the wiring for the hose may only exit from one end of a hose. On the angled versions of a cover, such cover 700, the wiring may exit opposite the end of the coupling (i.e. in FIG. 7 the coupling may extend out of opening 703, the hose out of opening 704 and wiring out of opening 705). Although wiring opening 605 in FIG. 6 is shown at an angle, forming a "Y" shape, a wiring opening out of a cover such as cover 600 may be disposed perpendicular to the coupling, resulting in a generally "T" shaped cover. The inner surfaces of wiring exits 605 or 705 may also have ridges, such as ridges 606 and 607 seen in FIG. 6, to grab onto any corrugated tubing, or the like, protecting the wiring.

Additionally, an access opening (510, 511, 610, 611, 710 or 711) may be disposed on either side of a cover. These openings allow access to a quick-connect couplings disconnect button, or the like. This will allow a quick-connect couplings to disconnect from an adapter without requiring the whole cover be removed. This increases the convenience and speed with which a conduit employing the present heating system can be attached or removed from a particular piece of equipment. It is also anticipated that gaps may be defined in the internal ridges of the cover to allow for better air flow in the cover to enhance heating of the coupling.

As noted above, heated SCR or hydraulic hoses may be exposed to elements, such as rain and snow. Embodiments of the present invention may employ molded ends to protect a heated hose from moisture and the interruption heating. Preferably, such a cover comprises an injection molded plastic that will cover the end of the connector and seal against any insulation material covering the heating sleeve and/or the hose. The molded plastic will also preferably have provisions for sealing around power wires to eliminate moisture from migrating into the electrical connection.

Figure 9:
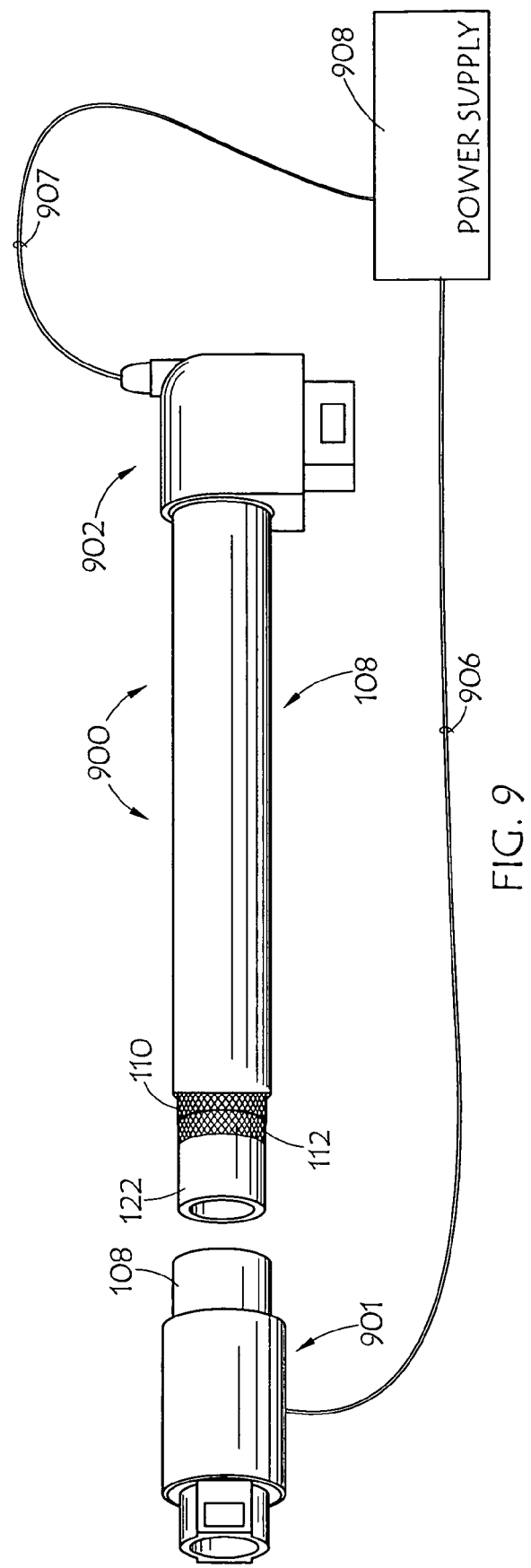
FIG. 9 is a partially fragmented illustration of an embodiment of a heated fluid conduit of the present invention employing molded end covers.

FIG. 9 is a partially fragmented illustration of embodiment 900 of a heated fluid conduit of the present invention employing molded end covers 901 and 902. In accordance with the present invention, heated fluid conduit 900 might, similar to conduit 100, have a body with a semi-conductive material disposed therein and one or more wires 905 and 906 coupling electrical power supply 908 to the conduit to provide a voltage across the conduit and an electrical current therethrough to heat the fluid conduit. However, conduit 900 also employs end covers 901 and 902, molded over a fitting or the like fitted to an end of the conduit. Overmolded end covers 901 and/or 902 may also be molded over an end of wire 905, facilitating coupling of power supply 908 to an end of the conduit. Similar to as discussed above, electrical power supply 908 may be coupled to each end of the conduit, and also possibly another terminal of the electrical power supply may be couple to the conduit at one or more points therebetween such as discussed above with respect to FIG. 4. Preferably, end covers 901 and 902 insulate their overmolded fittings, to aid in retaining heat generated by the current. An insulating jacket may be disposed over the conduit, as discussed above, to retain the fluid conduit's heat. Ends of such an insulating jacket may be captured by overmolded ends 901 and 902 to maintain it in place.

A method for providing heated fluid conduit 900 having overmolded end covers 901 and 902 might comprise disposing a semi-conductive material in the body of fluid conduit 900, and molding end covers 901 and 902 at an end of conduit 900. Preferably, this overmolding captures electrical conductor 905 in contact with the body of conduit 900. An electrical current may then be applied to conduit 900, through electrical conductor 905, across the body of fluid conduit 900, heating fluid conduit 900. As noted above, the semi-conductive material might comprise semi-conductive carbon fiber material, and as also noted above, the semi-conductive material might be disposed in interior tube 122 of hose 900 and/or in covering layer 108 of hose 900.

Figure 10:
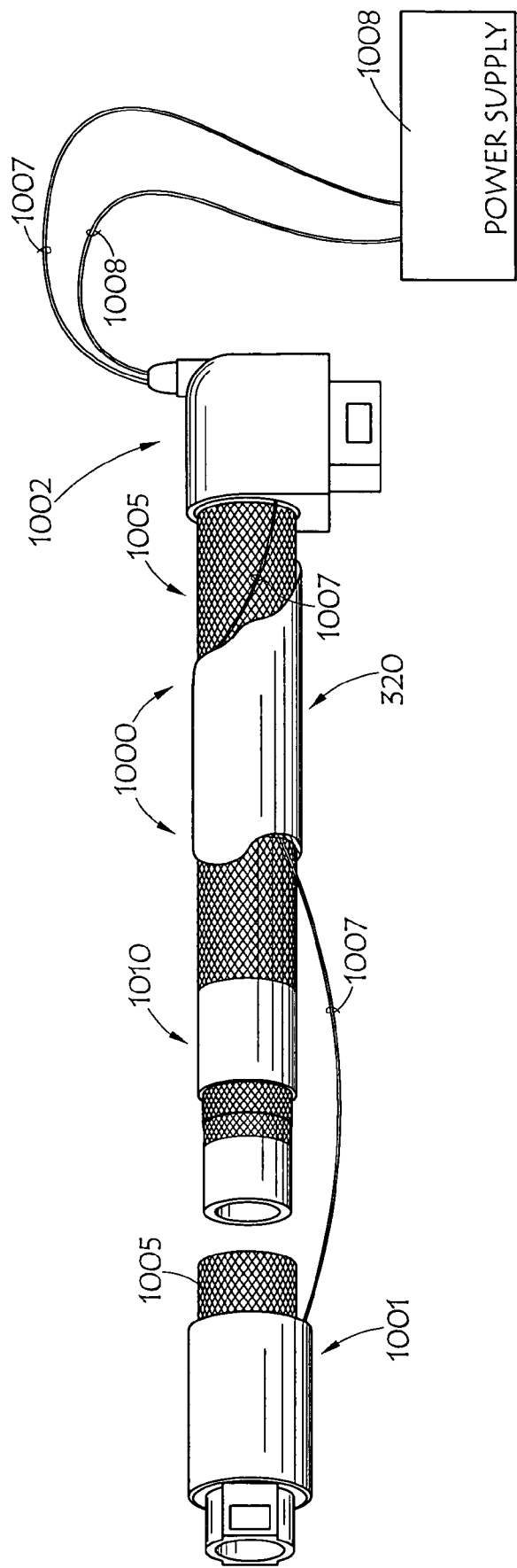
FIG. 10 is a perspective illustration of an embodiment of a fluid conduit heating system in accordance with the present invention employing molded fitting covers.

FIG. 10 is a perspective illustration of embodiment 1000 of a fluid conduit heating system in accordance with the present invention employing molded fitting covers 1001 and 1002. fluid conduit heating system 1000, may employ semi-conductive sleeve 1005 disposed over fluid conduit 1010 with sleeve 1005 extending at least partially over a fitting fitted to an end of conduit 1010. Electrical power supply 1008 may be coupled to each end of sleeve 1005 to provide a voltage across sleeve 1005 and a resulting electrical current through semi-conductive sleeve 1005 to heat sleeve 1005 and fluid conduit 1010, within. End covers 1001 and 1002 are preferably molded over at least a portion of the fitting and the sleeve extending thereover. At least one of the terminals of electrical power supply 1008 is preferably coupled to ends of sleeve 1005, such as by wires 1006 and 1007, and one terminal of the electrical power supply may be coupled to sleeve 1005 at one or more points therebetween, such as discussed with respect to FIG. 4 above, preferably in an alternating polarity arrangement. As with the above embodiments, the end covers 1001 and 1002 preferably insulate the fittings, retaining heat provided by the current. Insulating jacket 320, similar to as described above, may be disposed over the conduit and the sleeve, retaining the heating of the sleeve and the fluid conduit. Preferably, ends of insulating jacket 320 are overmolded and retained by molded covers 1001 and 1002.

Hence, a method for heating fluid conduit 1010 might comprise disposing semi-conductive sleeve 1005 over fluid conduit 1010 and molding end covers 1001 and 1002 at ends of fluid conduit 1010, capturing an end of sleeve 1005 and one or more electrical conductors 1006 and/or 1007 in contact with sleeve 1005. To heat conduit 1010 an electrical current may be applied, through electrical conductors 1006 and 1007 to semi-conductive sleeve 1005, heating sleeve 1005 and fluid conduit 1010 within. As noted, sleeve 1005 might comprise a fabric sleeve having carbon fiber threads which at least are semi-conductive. Also, similar to as discussed above the electrical current may be applied by coupling a first terminal of an electrical power supply to a first end of the sleeve (such as via illustrated wire 1006) coupling a second terminal of the power supply to a second end of the sleeve (such as via wire 1007) and providing a voltage from the power supply across the terminals. Alternatively, the electrical current may be applied by coupling a first terminal of an electrical power supply to each end of the sleeve, coupling a second terminal of the power supply to the sleeve in between the ends, and selectively providing a voltage from the power supply across the terminals such as discussed with respect to FIG. 4 above. More intermediate terminal connections may be provided, preferably of alternating polarity, to afford an ability to control heating of the conduit along its length.

Such systems and methods preferably provide a water proof, or at least a weather resistant heated hose. Ideally, the sealing of heated hose 9000, or the sealing of system 1000, as provided by molded ends 9001 and 9002, or 1001 and 1002, respectively, will provide a water submersible heated hose assembly.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A heated fluid conduit comprising:
   a fluid conduit having a body with a semi-conductive material comprising semiconductive carbon fiber material disposed therein;
   at least one wire coupling an electrical power supply to said conduit to provide a voltage across said conduit and an electrical current therethrough, heating said fluid conduit; and
   an end cover molded over a fitting fitted to an end of said conduit and over an end of said wire coupling said power supply to an end of said conduit.

2. The conduit of claim 1 wherein said coupling comprises coupling said electrical power supply to each end of said conduit.

3. The conduit of claim 1 wherein said coupling comprises coupling one terminal of said electrical power supply to at least one end of said conduit and another terminal of said electrical power supply to said conduit along the length of the conduit.

4. The conduit of claim 1, wherein said semi-conductive material is disposed in the tube of said hose.

5. The conduit of claim 1, wherein said semi-conductive material is disposed in the covering layer of said hose.

6. The conduit of claim 1 wherein said end cover insulates said fitting retaining heat provided by said current.

7. The conduit of claim 1 further comprising an insulating jacket disposed over said conduit and retaining said heating of said fluid conduit.

8. A fluid conduit heating system comprising:
    a semi-conductive sleeve disposed over a fluid conduit, said sleeve extending at least partially over a fitting fitted to an end of said conduit, said sleeve comprises a fabric sleeve having carbon fiber threads which are semi-conductive;
    an electrical power supply coupled to each end of said sleeve to provide a voltage across said sleeve and a resulting electrical current through said semi-conductive sleeve, heating said sleeve and said fluid conduit; and
    an end cover molded over at least a portion of said fitting and said sleeve extending thereover.

9. The conduit of claim 8 wherein one terminal of said electrical power supply is coupled to at least one end of said sleeve and another terminal of said electrical power supply is coupled along a length of said sleeve.

10. The system of claim 8 wherein said end cover insulates said fitting retaining heat provided by said current.

11. The system of claim 8 further comprising an insulating jacket disposed over said conduit and said sleeve, retaining said heating of said sleeve and said fluid conduit.

12. A method comprising:
    disposing a semi-conductive material comprising semi-conductive carbon fiber material in the body of a fluid conduit;
    molding an end cover at an end of said conduit, capturing an electrical conductor in contact with said body of said conduit; and
    applying an electrical current, through said electrical conductor, across said body of said fluid conduit, heating said fluid conduit.

13. The method of claim 12, wherein said disposing comprises disposing said semiconductive material in an interior tube of a hose.

14. The method of claim 12, wherein said disposing comprises disposing said semiconductive material in a covering layer of a hose.

15. A method comprising:
    disposing a semi-conductive sleeve over a fluid conduit wherein said sleeve comprises a fabric sleeve having carbon fiber threads which are semi-conductive;
    molding an end cover at an end of said fluid conduit, capturing an end of said sleeve and an electrical conductor in contact with said sleeve; and
    applying an electrical current, through said electrical conductor to said semi-conductive sleeve, heating said sleeve and said fluid conduit within.

16. The method of claim 15, wherein said applying of said electrical current comprises:
    coupling a first terminal of an electrical power supply to a first end of said sleeve;
    coupling a second terminal of said power supply to a second end of said sleeve; and
    providing a voltage, by said power supply across the terminals.

17. The method of claim 15, wherein said applying of said electrical current comprises:
    coupling a first terminal of an electrical power supply to at least one end of said sleeve;
    coupling a second terminal of said power supply to said sleeve, between said ends; and
    providing a voltage, by said power supply across the terminals.

18. The method of claim 15, further comprising insulating said conduit and sleeve to retain heat.

* * * * *